(12) United States Patent
Lee et al.

(10) Patent No.: US 7,894,339 B2
(45) Date of Patent: Feb. 22, 2011

(54) HIGH SPEED PLC NETWORK-ETHERNET BRIDGE SYSTEM SUPPORTING QOS

(75) Inventors: Kwang il Lee, Daejeon (KR); Dong-Hwan Park, Daegu (KR); Jun hee Park, Daejeon (KR); Chae kyu Kim, Daejeon (KR); Kyeong deok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 607 days.

(21) Appl. No.: 11/760,995

(22) Filed: Jun. 11, 2007

(65) Prior Publication Data

US 2008/0080380 A1   Apr. 3, 2008

(30) Foreign Application Priority Data

Sep. 29, 2006   (KR) ............... 10-2006-0096420

(51) Int. Cl.
*H04J 1/16* (2006.01)
*H04W 4/00* (2009.01)
*H04L 12/28* (2006.01)

(52) U.S. Cl. ............... 370/230; 370/338; 370/389; 370/402

(58) Field of Classification Search ............... 370/402, 370/389, 252, 230; 710/72; 395/140, 155, 395/161
See application file for complete search history.

(56) References Cited

U.S. PATENT DOCUMENTS

| | | | |
|---|---|---|---|
| 5,615,323 A | * | 3/1997 | Engel et al. ............... 345/440 |
| 7,463,877 B2 | * | 12/2008 | Iwamura ............... 455/402 |
| 2004/0057437 A1 | | 3/2004 | Daniel et al. |
| 2004/0066789 A1 | | 4/2004 | Kobayashi |
| 2005/0116814 A1 | * | 6/2005 | Rodgers et al. ......... 340/310.01 |
| 2005/0172056 A1 | * | 8/2005 | Ahn ............... 710/72 |
| 2007/0053352 A1 | * | 3/2007 | Corcoran ............... 370/389 |
| 2007/0091925 A1 | * | 4/2007 | Miyazaki et al. ............ 370/469 |
| 2007/0195762 A1 | * | 8/2007 | Choi et al. ............... 370/389 |

FOREIGN PATENT DOCUMENTS

| | | |
|---|---|---|
| JP | 2002099471 | 4/2002 |
| KR | 1020030043649 | 6/2003 |
| KR | 1020040024969 | 3/2004 |
| KR | 1020040033565 | 4/2004 |
| KR | 1020040060605 | 7/2004 |

* cited by examiner

*Primary Examiner*—Melanie Jagannathan
(74) *Attorney, Agent, or Firm*—Ladas & Parry LLP

(57) ABSTRACT

Provided is a bridge system of a high-speed PLC network and Ethernet. The bridge system includes a QoS control unit for controlling a QoS process of an entire bridge system; a flow managing unit for storing and managing connection information on a flow, QoS information required by each flow, and information required for executing a bridge function; a bridge QoS processing unit for allocating and managing internal resources of the bridge system and providing the QoS by controlling the QoS control unit and making reference to information stored in the flow managing; a PLC QoS processing unit for managing the QoS of the PLC network by control of the QoS control unit; and an Ethernet QoS processing unit for managing a link state of the Ethernet and providing the link state to the QoS control unit.

14 Claims, 6 Drawing Sheets

HIGH SPEED PLC NETWORK-ETHERNET BRIDGE SYSTEM SUPPORTING QOS

CLAIM OF PRIORITY

This application claims the benefit of Korean Patent Application No. 10-2006-96420 filed on Sep. 29, 2006 in the Korean Intellectual Property Office, the disclosure of which is incorporated herein by reference.

BACKGROUND OF THE INVENTION

1. Field of the Invention

The present invention relates to a bridge system for connecting a high-speed Power Line Communication (PLC) network and Ethernet, and more particularly, to a bridge system for connecting the high-speed PLC network and Ethernet which can provide Quality of Service (QoS) by identifying a flow of each service when a bridge system performs a bridging operation to connect the high-speed PLC network which provides the QoS and the Ethernet which does not provide the QoS.

2. Description of the Related Art

In a home network field, diverse network technologies have been introduced to provide a multimedia service as well as a home automation service by connecting diverse electronic appliances used at home. A network technology for the home network is divided into a wired network technology and a wireless network technology. The wired network technology includes a method using a telephone line, a method using a power line and a method using Ethernet. The wireless network technology includes a method using Local Area Network (LAN) and a method using Bluetooth.

The Power Line Communication (PLC) technology is a technology for transmitting/receiving data and providing an Internet service using on the power line installed at home. The PLC technology has advantages of low cost and less effort required for laying additional communication infrastructure. Recently, HomePlug Powerline Alliance defines HomePlug AV (HPAV) to provide a high quality, a multi-stream and a home entertainment environment on the power line of home as a next generation standard technology. The HPAV adopts an enhanced physical layer and MAC layer technologies for providing a PLC network of 200 Mbps level. In particular, the MAC layer also provides Time Division Multiple Access (TDMA) method securing Quality of Service (QoS) such as reservation of a bandwidth, high reliability and the strict control of a delay time and Jitter as well as a Carrier Sense Multiple Access (CSMA) method. As described above, the high-speed PLC technology is expected to be used as a backbone network for providing the QoS in the home network field.

Meanwhile, Ethernet is the most broadly set up LAN technology. The Ethernet uses the CSMA method, in which multiple users share one circuit and a 100 Mbps transmission speed can be provided. There is an advantage that the Ethernet method provides an inexpensive high-speed network. However, the Ethernet generally does not provide any function for reliability of data or the QoS. When additional tag information is added to an Ethernet frame to provide the QoS function in the Ethernet as suggested in IEEE 802.1p/q, a maximum of 8 service classes can be defined according to priority and the differentiated QoS can be provided in the Ethernet. However, there is a disadvantage that overhead occurs for additional information in the Ethernet frame to provide priority information and it is required to set up tag information according to service classes in all devices.

A bridge apparatus for connecting the PLC network and the Ethernet is required to perform data communication between an electronic appliance connected to the PLC network and an electronic appliance connected to the Ethernet.

FIG. 1 is a block diagram illustrating a bridge apparatus for connecting a high-speed PLC network and the Ethernet.

As shown in FIG. 1, a bridge apparatus 30 for connecting a typical Ethernet and a PLC network includes a PLC device driver 32 and an Ethernet device driver 33. The PLC device driver 32 transmits and receives data through a PLC network 10. The Ethernet device driver 33 transmits and receives data through an Ethernet 20. The bridge apparatus 30 communicates with a PLC device 11 and an Ethernet device 21. The PLC device 11 includes an application 12 and a PLC device driver 13, and is connected to the PLC network 10. The Ethernet device 21 includes an application 22 and an Ethernet device driver 23, and is connected to the Ethernet 20. Also, the bridge apparatus 30 performs a bridging operation that determines a destination network according to a second layer address of a destination and transforming a frame transmitted from the Ethernet device 21 or the PLC device 11 into a frame format corresponding to a destination network through a bridge function unit 31.

As described above, the high-speed PLC network can provide the QoS function, but Ethernet does not provide the QoS function. Therefore, when an Ethernet traffic is transmitted through the PLC network, the QoS function provided by the PLC network is not used. In addition, since the Ethernet does not secure the QoS in case that a QoS traffic securing the QoS in the high-speed PLC network is transmitted through the Ethernet, the QoS is not provided. Therefore, there is a demand for a method for providing the QoS by removing the heterogeneity of QoS between two networks except the bridging function in the bridge system for connecting the high-speed PLC network, which provides the QoS and the Ethernet, which does not provide the QoS.

SUMMARY OF THE INVENTION

The present invention has been made to solve the foregoing problems of the prior art and it is therefore an object according to certain embodiments of the present invention is to provide a bridge system of a high-speed Power Line Communication (PLC) network and Ethernet for performing an effective bridging operation to bridge the high-speed PLC network which provides Quality of Service (QoS) and the Ethernet which does not provide the QoS, and provide the QoS.

Another object according to certain embodiments of the invention is to provide a bridge system of the high-speed PLC network and the Ethernet for providing optimal QoS suitable to a traffic by acquiring traffic characteristics information of a service based on diverse methods when the bridge system performs a bridging operation to bridge the high-speed PLC network which provides the QoS and the Ethernet which does not provide the QoS.

Still another object according to the certain embodiment of the invention is to provide a bridge system of a high-speed PLC network and an Ethernet bridge system, which can adaptively provide QoS to be proper to traffic characteristics of each service by registering a flow of all application services and acquiring QoS information without limitation to a specific application.

According to an aspect of the invention for realizing the object, there is provided 1. Abridge system for connecting a high-speed Power Line Communication (PLC) network and Ethernet including: a Quality of Service (QoS) control unit for controlling a QoS process of the entire bridge system; a flow managing unit for storing and managing connection information of a flow, QoS information required by each flow, and information required for executing a bridge function; a bridge QoS processing unit for allocating and managing internal resources of the bridge system and providing the QoS by controlling the QoS control unit and making reference to information stored in the flow managing unit; a PLC QoS processing unit for managing the QoS of the PLC network by control of the QoS control unit; and an Ethernet QoS processing unit for managing a link state of the Ethernet and providing the link state to the QoS control unit.

The bridge system may further include: a policy database (DB) for storing a flow identifying policy and a managing policy for processing the QoS.

The flow identifying policy information may include a combination of at least one of a Media Access Control (MAC) address, Internet Protocol (IP) address, a port number, a protocol number and priority information.

The flow managing unit may include: a flow manager for managing flow information to provide the QoS and QoS information; a flow register table for storing information on a flow to provide the QoS by control of the flow manager; and a connection table for managing connection information and QoS information set up on the PLC network to provide the QoS.

The bridge QoS processing unit may comprise a local resources manager for transforming the QoS information transmitted from the QoS control unit into locally required QoS information, checking whether the transformed QoS can be provided, and requesting resources allocation and a QoS process; a local QoS mapper for transforming the QoS information into locally proper QoS information; an admission controller for checking whether the QoS can be provided; a local QoS monitor for monitoring a local QoS state; an identifier for extracting connection information from a reception frame and selecting a corresponding QoS process policy in the flow managing unit based on the connection information; a scheduler for controlling queuing of the reception frame according to the QoS process policy selected in the identifier; and a buffer manager for transmitting each frame, on which queuing is performed by control of the scheduler, to a destination according to the QoS process policy.

The PLC QoS processing unit may comprise a PLC QoS mapper for transforming QoS information provided from the QoS control unit into QoS information, which is proper to the PLC network; a PLC link monitor for monitoring a link state and a QoS state set up on the PLC network; and a PLC connection manager for receiving service connection information and QoS information from the QoS control unit, transforming the QoS information into QoS information of the PLC network through the PLC QoS mapper, requesting connection setup/release to a PLC device driver based on the transformed QoS and service connection information, and transmitting a result value to the QoS control unit.

The Ethernet QoS processing unit may comprise an Ethernet link monitor for monitoring a link state of the connection by an Ethernet device driver; and an Ethernet connection manager for controlling connection setup/release on Ethernet.

The bridge system may further comprise an external input unit for receiving the policy information and the flow information from the outside of the bridge system and transmitting the policy information and the flow information to the QoS control unit. The QoS control unit may read a policy formation file from the outside of the bridge system through the external input unit or acquiring flow register information or a policy, which are related to providing of the QoS by user input, and providing the information to the policy DB and the flow managing unit.

The Ethernet QoS processing unit may include an Ethernet flow predictor for analyzing all traffic received through the Ethernet, calculating traffic characteristics and quantity of all flows, predicting the traffic characteristics for a pre-determined time hereinafter, and transmitting the traffic characteristics to the QoS control unit. The QoS control unit may change bridge resources allocation and connection setup, which can satisfy the characteristics of the traffic required by the PLC network, based on the Ethernet prediction information, and stores the set-up connection information in the flow managing unit.

The PLC QoS processing unit may further include a PLC flow predictor for calculating a future effect by the link state of the PLC network that the PLC link monitor monitors and requesting resources change to the PLC connection manager based on the calculated prediction information.

The bridge system may further comprise a Universal Plug and Play (UPnP) flow monitoring agent for inquiring and collecting connection information and information on a data format, which is transmitted through the corresponding connection, to all apparatuses capable of providing a connection management service, which is provided from a UPnP AV structure connected to its own Ethernet, based on the UPnP AV structure, and transmitting the collected connection information and data format information to the QoS control unit.

The QoS control unit may register the connection information collected through the UPnP flow monitoring agent in the flow managing unit and uses the data format used in each connection to QoS and PLC connection setup in the bridge system by a pre-defined method.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 1:
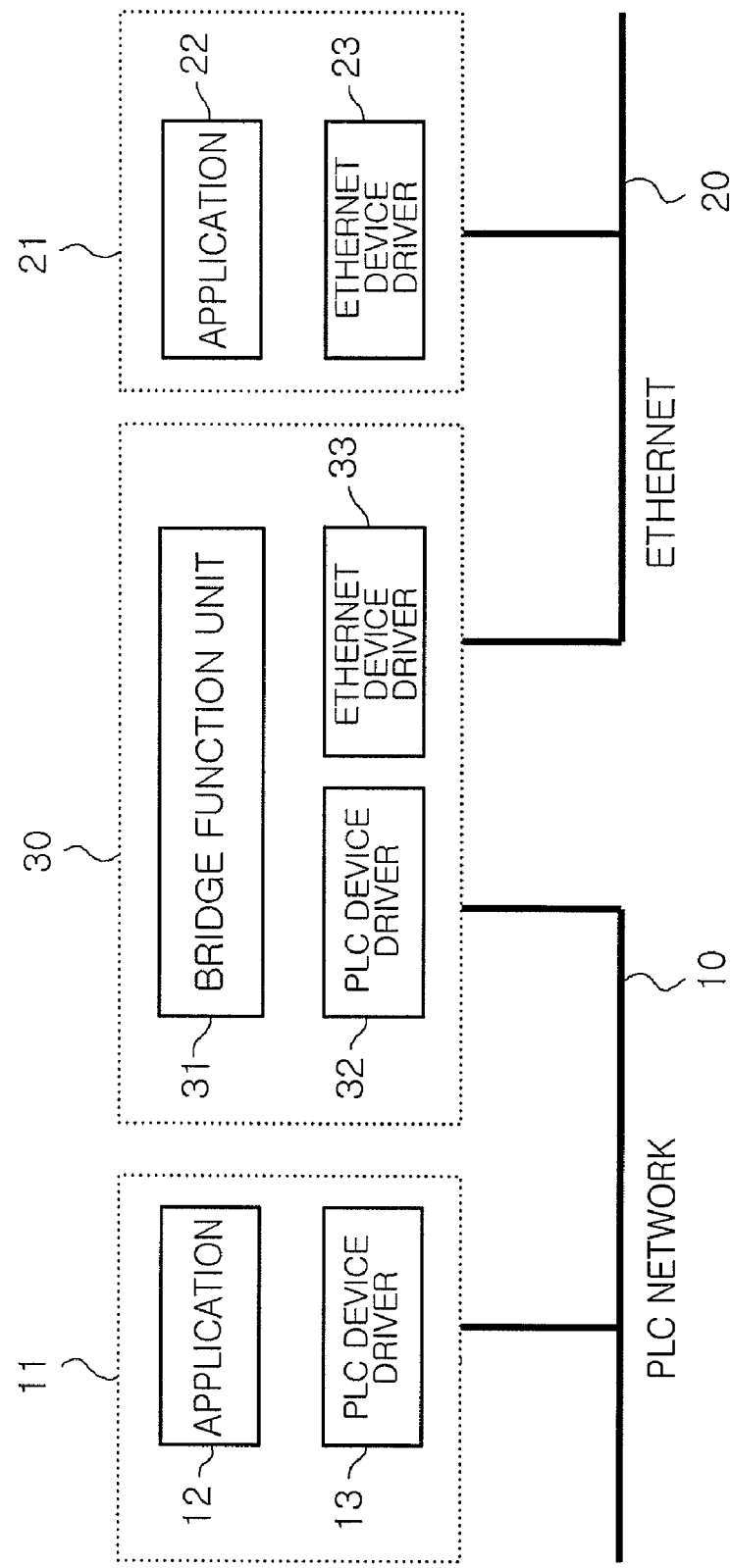
FIG. 1 is a diagram illustrating a bridge system connecting a PLC network and an Ethernet according to the related art.
Figure 2:
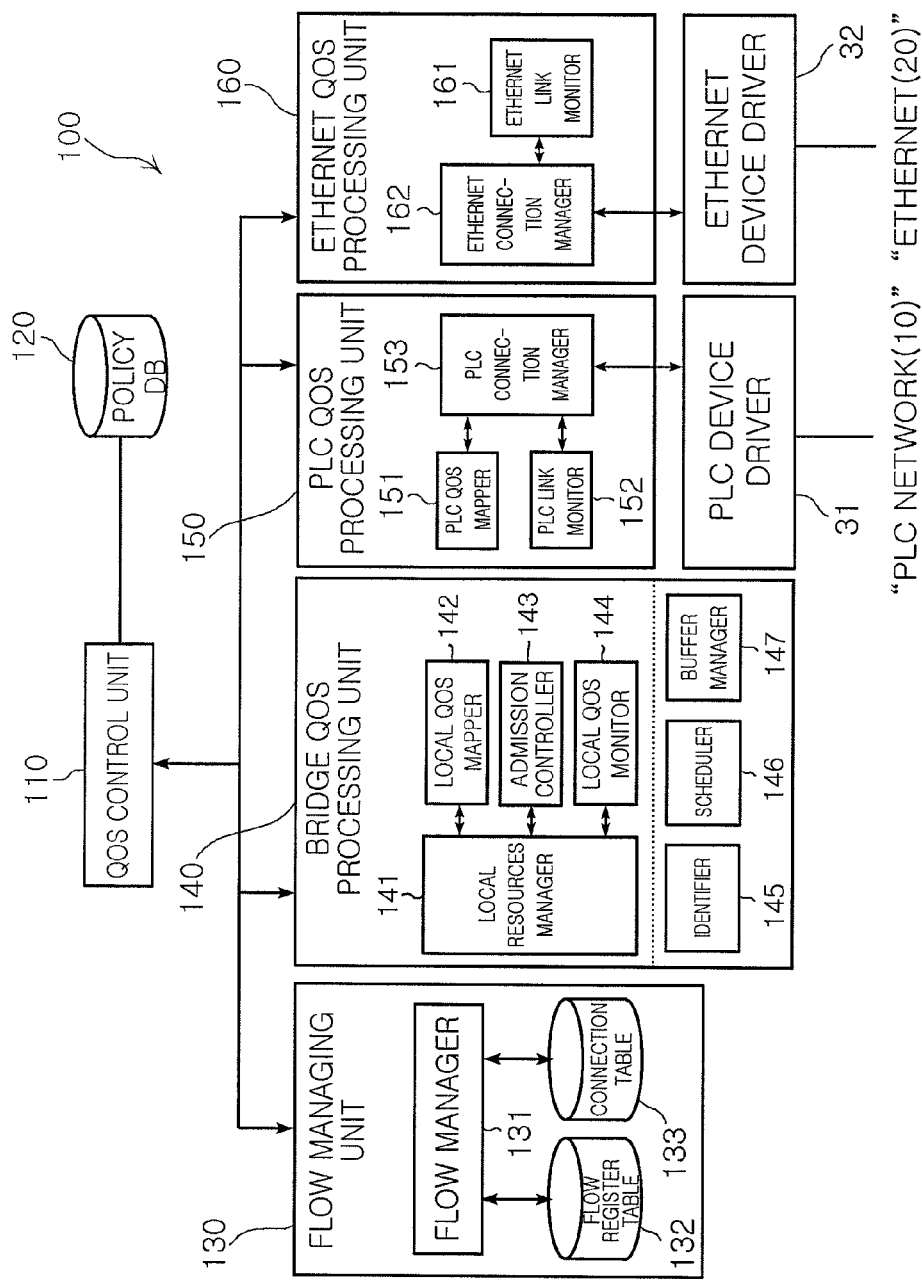
FIG. 2 is a diagram illustrating a bridge system for connecting a high-speed Power Line Communication (PLC) network and Ethernet according to a first exemplary embodiment of the present invention.

FIG. 2 is a diagram illustrating a bridge system of a high-speed Power Line Communication (PLC) network and Ethernet according to a first exemplary embodiment of the present invention.

Referring to FIG. 2, a bridge system 100 of the high-speed PLC network and the Ethernet includes a Quality of Service (QoS) control unit 110, a flow managing unit 130, a bridge QoS processing unit 140, a PLC QoS processing unit 150 and an Ethernet QoS processing unit 160. The QoS control unit 110 manages a QoS function of the entire bridge system. The flow managing unit 130 stores and manages connection information on a flow, QoS information required in each flow, and information required for performing a bridge function. The bridge QoS processing unit 140 allocates and manages internal resources of the bridge system 100, and provides the QoS. The PLC QoS processing unit 150 manages the QoS of the PLC network. The Ethernet QoS processing unit 160 monitors a link state of the Ethernet.

The bridge system of the high-speed PLC network and the Ethernet of the present invention further includes a policy DB 120 for storing a flow identifying policy and a QoS providing policy. The policy DB 120 stores policy information, which is provided from the outside of the bridge system 100 or internally pre-determined by the bridge system 100. The policy DB 120 also searches corresponding policy information upon request of the QoS control unit 110 and responds to the QoS control unit 110.

The policy information includes the flow identifying policy for describing a basic flow identification unit to provide the QoS and a connection managing policy for the policy information related to connection setup of each flow. The flow identifying policy information includes at least one of a Media Access Control (MAC) address, an Internet Protocol (IP) address, a port number, a protocol number, and priority information. The flow can be identified by combination of the information. The priority information can use priority information of IEEE 802.1p/q or Type of Service (TOS) information provided in an IP header. For example, when the flow identifying policy is set up to identify the flow based on only the MAC address, the flow identifying policy provides identical QoS to all integrated traffics generated between two apparatuses. However, the flow identifying policy does not provide the QoS for each service flow.

The flow managing unit 130 includes a flow manager 131, a flow register table 132 and a connection table 133. The flow manager 131 manages flow information and QoS information for providing the QoS. The flow register table 132 stores information on the flow to provide the QoS by control of the flow manager 131. The connection table 133 manages connection information and QoS information set up on the PLC network to provide the QoS. When the bridge QoS processing unit 140 requests the process of the reception frame, the connection information and the QoS information stored in the connection table 133 are provided and used to execute a bridge function.

The bridge QoS processing unit 140 allocates resources in the inside of the bridge system 100 and provides the QoS. The bridge QoS processing unit 140 is divided into a control plane and a data plane. The control plane sets up the QoS and controls internal constitutional elements of the bridge. The data plane processes the QoS of a reception frame.

The control plane includes a local resources manager 141, a local QoS mapper 142, an admission controller 143 and a local QoS monitor 144. The local resources manager 141 transforms the QoS information transmitted from the QoS control unit 110 into locally required QoS information, checks whether the transformed QoS can be provided, and requests to allocate resources and process the QoS. The local QoS mapper 142 transforms the QoS information into local QoS information, which is internal resource of the bridge. The admission controller 143 checks whether the QoS can be provided. The local QoS monitor 144 monitors a local QoS state. The data plane includes an identifier 145, a scheduler 146 and a buffer manager 147. The identifier 145 extracts connection information from a reception frame and selects a corresponding QoS process policy from the connection table 133 of the flow managing unit 130. The scheduler 146 controls queuing of the reception frame according to the QoS process policy selected in the identifier 145. The buffer manager 147 transmits each frame, on which the scheduler 146 controls queuing, to a destination according to the QoS process policy.

The PLC QoS processing unit 150 includes a PLC QoS mapper 151, a PLC link monitor 152, and a PLC connection manager 153. The PLC QoS mapper 151 transforms the QoS information provided from the QoS control unit 110 into QoS information, which is proper to the PLC network. The PLC link monitor 152 monitors a link state and a QoS state set up on the PLC network. The PLC connection manager 153 receives service connection information and QoS information from the QoS control unit 110, transforms the QoS information into QoS information of the PLC network through the PLC QoS mapper 151, and requests connection setup/release to the PLC device driver 31 based on the transformed QoS information and the service connection information. Subsequently, the PLC connection manager 153 transmits a result value to the QoS control unit 110.

The Ethernet QoS processing unit 160 includes an Ethernet link monitor 161 and an Ethernet connection manager 162. The Ethernet link monitor 161 monitors a link state of the connection by an Ethernet device driver 32. The Ethernet connection manager 162 controls connection setup/release on the Ethernet.

As described above, an operation in the formed bridge system 100 is realized as follows.

The bridge system 100 sets up a basic flow identifying policy and a connection managing policy in the policy DB, and stores a flow registered to provide the QoS, the related connection and QoS information.

In the above state, when a frame is received through a lower device interface, i.e., the PLC device driver 31 or the Ethernet device driver 32, the identifier 145 of the bridge QoS processing unit 140 extracts connection information from the reception frame.

The identifier 145 inquires the connection table 133 of the flow managing unit 130 based on the extracted connection information and checks QoS information on the corresponding connection and information on output. When it turns out that the QoS information related to the reception frame does not exist in the connection table 133, the identifier 145 notifies the result to the QoS control unit 110.

The QoS control unit 110 searches the flow register table 132 and checks whether the reception frame is a registered flow or not.

When it turns out that the flow is registered, the QoS control unit 110 transmits service connection information and QoS information on a corresponding flow to the bridge QoS processing unit 140 and the PLC QoS processing unit 150 and requests setup.

The PLC network can set up the QoS information based on format information of the data such as audio, video, Moving Picture Experts Group (MPEG), and Joint Photographic Experts Group (JPEG) in the flow register table 132, traffic characteristics information of a pre-defined flow or a basic QoS information value. The set-up connection information is stored with the connection information in the connection table 133.

The local resources manager 141 of the bridge QoS processing unit 140 receives the flow connection information and the QoS information from the QoS control unit 110 and transforms the first received QoS information into QoS information locally required in the inside of the bridge QoS processing unit 140 through the local QoS mapper 142. Based on the transformed QoS information, the local resources manager 141 inquires and checks about whether the admission controller 143 can provide a corresponding QoS.

When the admission controller 143 can provide the corresponding QoS, the local resources manager 141 requests allocating and processing of resources required for providing the QoS of the corresponding service to the identifier 145, the scheduler 146, and the buffer manager 147. When the admission controller 143 cannot provide the corresponding QoS, the local resources manager 141 transmits a QoS information change request for providing the corresponding service to the QoS control unit 110 based on monitoring information of the local QoS monitor 144. When the QoS control unit 110 approves the transform, the local resources manager 141 requests allocating and processing of resources required for providing the transformed QoS to the identifier 145, the scheduler 146, and the buffer manager 147.

As a determination result of the QoS control unit 110, when it turns out that the corresponding frame is not the registered flow, the QoS control unit 110 selects one of the links set up on the PLC network according to the pre-defined policy, which is stored in the policy DB 120. Subsequently, the QoS control unit 110 stores the connection information and the QoS information of the link in the connection table 133 of the flow managing unit 130.

As described above, when the QoS process policy for the flow of the reception frame is determined, the scheduler 146 determines queuing or dropping of the reception frame according to the determined QoS policy. When it is determined to drop the reception frame, the corresponding frame is not transmitted to the destination, but removed in the inside of the bridge system 100. Otherwise, the frame is stored in a queue corresponding to the QoS policy and transmitted to the destination by control of the buffer manager 147.

The PLC connection manager 153 of the PLC QoS processing unit 150 receives the connection information of the service and the QoS information transmitted from the QoS control unit 110 to the PLC QoS processing unit 150

The PLC connection manager 153 transforms the received general-purpose QoS information into QoS information, which can be used in the PLC network, through the PLC QoS mapper 151. For example, since the general-purpose QoS information is different from information defined in a connection specification (CSPEC) in case of HomePlug AV (HPAV), the PLC connection manager 153 extracts CSPEC related-information from the general-purpose QoS information and transforms the CSPEC related-information into proper CSPEC information based on the related information. Subsequently, the PLC connection manager 153 requests connection setup/release to the PLC device driver 31 based on the transformed QoS information and transmits a result value to the QoS control unit 110.

The PLC link monitor 152 of the PLC QoS processing unit 150 periodically monitors a QoS state and a link state of all connections set up on the PLC network through the PLC device driver 31. The PLC link monitor 152 transmits the monitored information to the PLC connection manager 153 or the QoS control unit 110 periodically or at a time that a specific case occurs. Herein, a monitoring cycle may be changed according to the network state or the QoS state. The monitoring information is transmitted to the QoS control unit 110 through the PLC connection manager 153 and can be used to allocate additional resources.

The Ethernet QoS processing unit 160 includes the Ethernet link monitor 161 and the Ethernet connection manager 162. The Ethernet link monitor 161 monitors the link state of the Ethernet. The Ethernet connection manager 162 requests the connection setup/release of the Ethernet device driver 32 and provides the monitoring information of the Ethernet link monitor 161 to the QoS control unit 110. The monitoring cycle of the Ethernet link state may be changed according to the network state or upon request of the QoS manager.

In the above-mentioned PLC network and Ethernet bridge system of the present invention, the formation may be partly changed according to the method for registering the flow for providing QoS to the flow register table 132 of the flow managing unit 130.

FIG. 3 to FIG. 6 are diagrams illustrating bridge systems modified according to a method of registering a flow according certain embodiments of the present invention.

The structure and operation of bridge systems based on various flow registering methods will be described with reference to FIG. 3 to FIG. 6.

Figure 3:
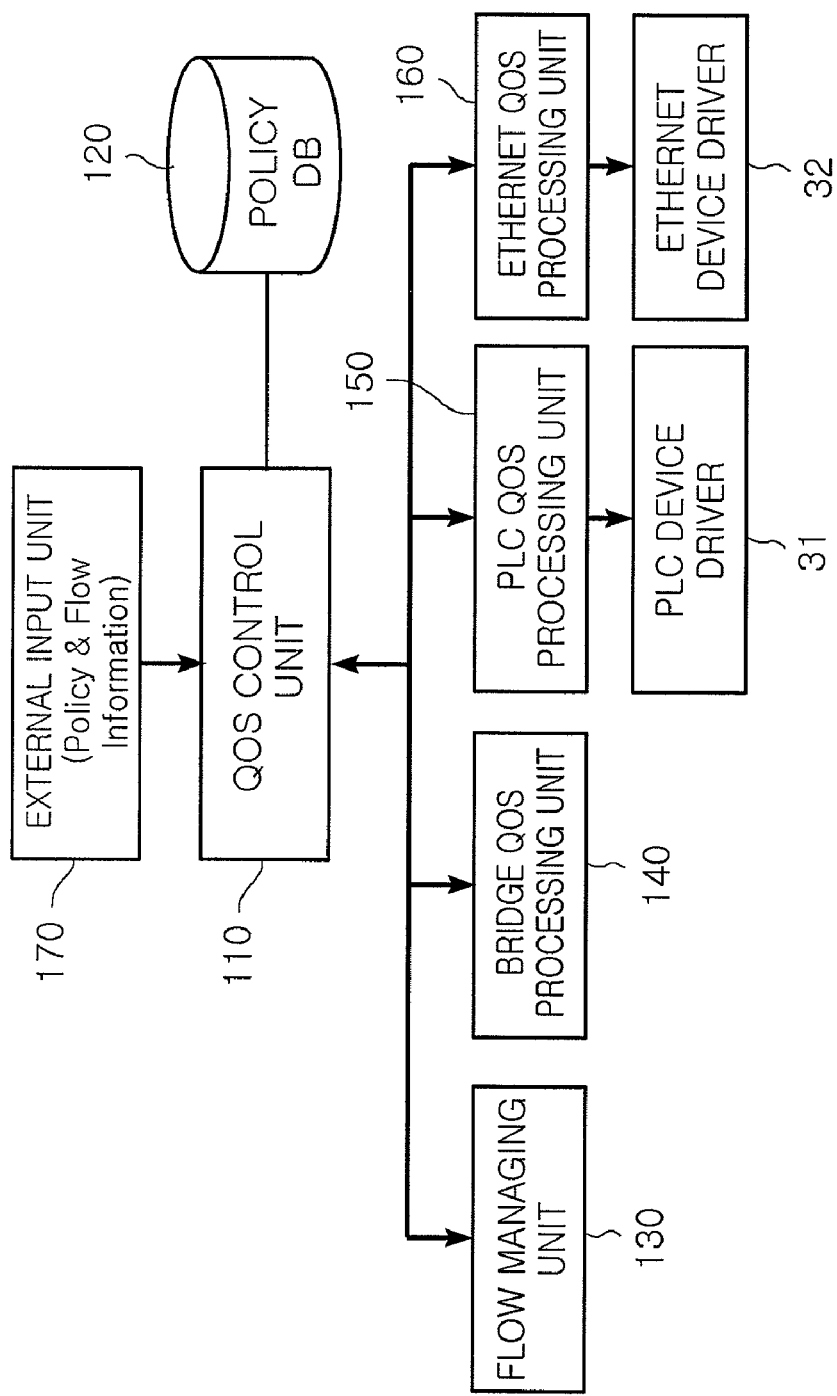
FIG. 3 is a diagram illustrating a bridge system for connecting a high-speed Power Line Communication (PLC) network and Ethernet according to a second exemplary embodiment of the present invention.

FIG. 3 is a block diagram illustrating a bridge system that registers a flow through an extern input and provides the QoS.

In this case, the bridge system of the present embodiment further includes an external input unit 170 in addition to the constitutional elements of the bridge system shown in FIG. 2. The external input unit 170 receives policy information and flow information from the outside of the bridge system and transmits the policy information and the flow information to the QoS control unit 110.

In the bridge system of FIG. 3, the QoS control unit 110 reads a policy formation file from the outside of the bridge system through the external input unit, or acquires flow register information or a policy related to providing of the QoS by user input. Also, the QoS control unit 110 stores the information in the policy DB 120 and the flow managing unit 130.

The information required for registering a flow for providing QoS includes the connection information of the service flow such as an MAC address, an IP address, a port number and a protocol number, a data type, and combination of traffic characteristics information. The acquired policy includes a flow identifying policy and a connection managing policy.

After setting up the policy and registering the flow based on the information inputted through the external input unit 170, operations of other constitutional elements for providing QoS based on the stored flow register information and the policy are identical to those in the bridge system according to the first embodiment.

The bridge system of the present invention can dynamically perform flow register by monitoring the Ethernet traffic.

Figure 4:
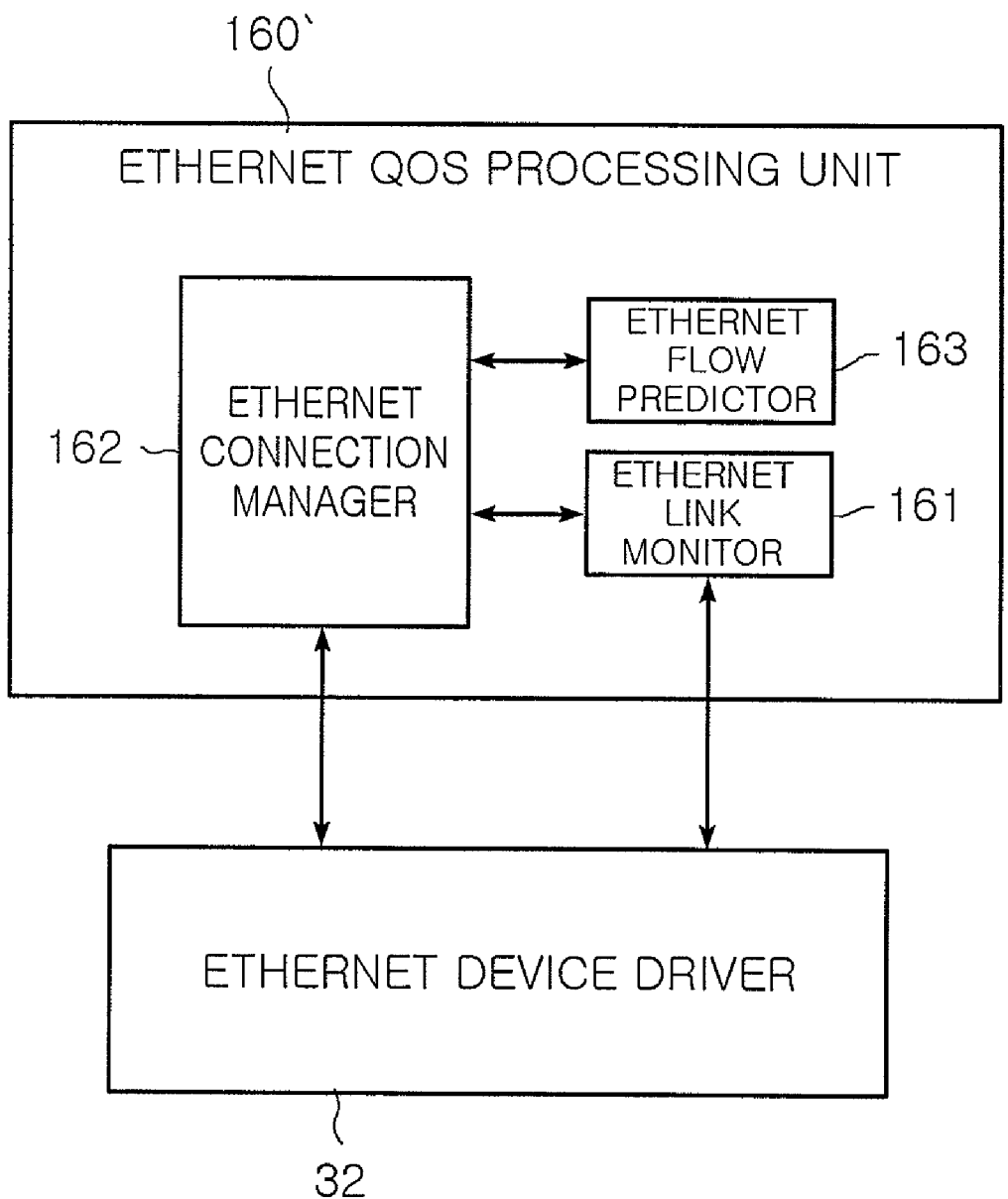
FIG. 4 is a block diagram illustrating an Ethernet QoS processing unit of a bridge system according to a third exemplary embodiment of the present invention.

FIG. 4 is a block diagram illustrating an Ethernet QoS processing unit modified for registering flows by monitoring Ethernet traffic.

Referring to FIG. 4, the Ethernet QoS processing unit 160' further includes an Ethernet flow predictor 163 as well as the Ethernet link monitor 161 and the Ethernet connection manager 162.

The Ethernet flow predictor 163 analyzes all traffics received through Ethernet, calculates characteristics and quantity of the traffic for all flows and predicts the traffic characteristics for a pre-determined time hereinafter. The prediction information of the Ethernet flow predictor 163 is transmitted to the Ethernet connection manager 162. Accordingly, the Ethernet connection manager 162 requests resources change to the QoS control unit 110 or the bridge QoS processing unit 140.

The QoS control unit 110 and the bridge QoS processing unit 140 perform allocation of the internal bridge resources and connection setup, which can satisfy the traffic characteristics requested by the PLC network, based on the information predicted by the Ethernet flow predictor 163. The setup connection information is stored in the connection table 133.

The bridge system of the present embodiment can register the flow by monitoring the PLC network.

Figure 5:
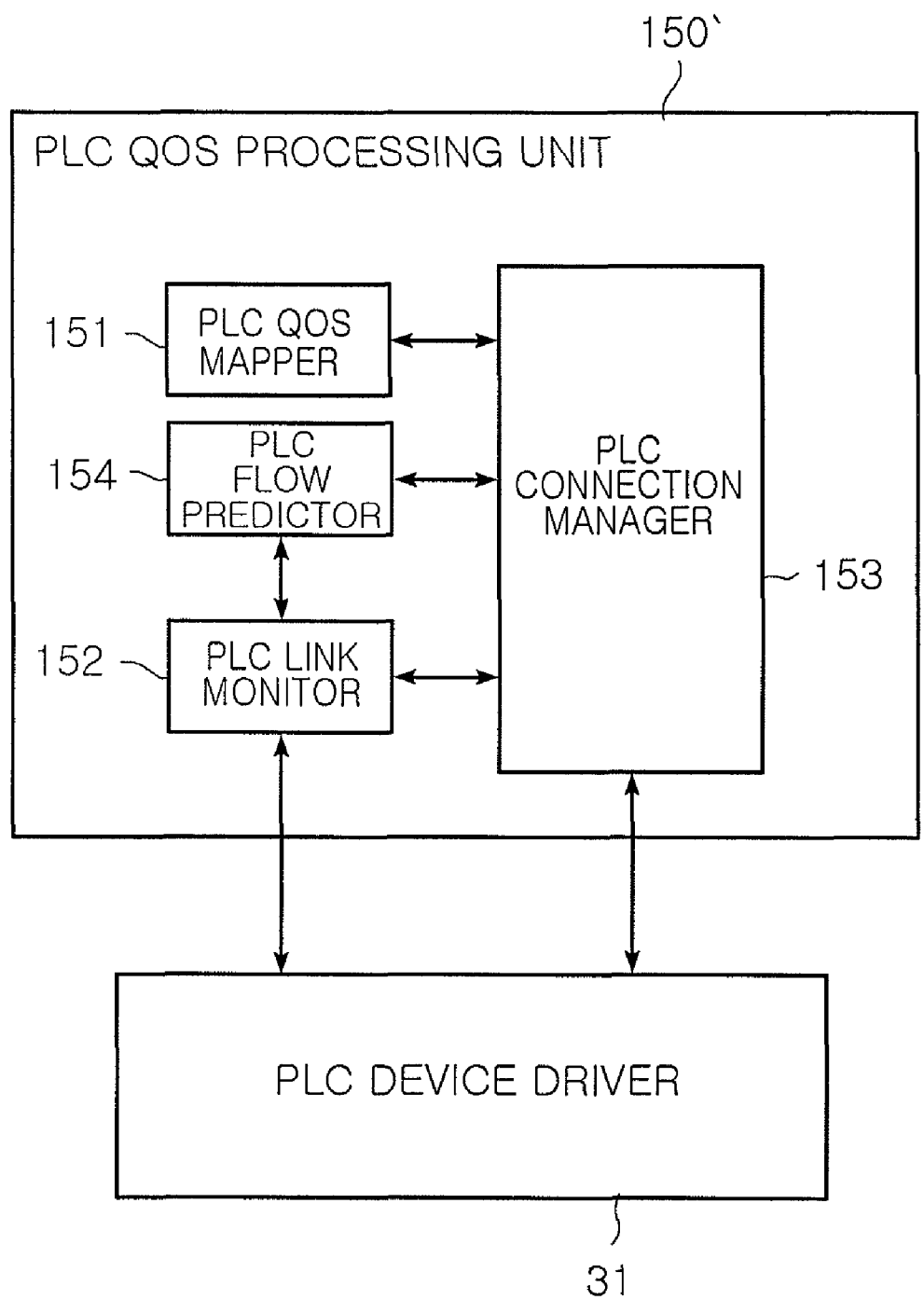
FIG. 5 is a block diagram illustrating a PLC QoS processing unit of a bridge system according to a fourth exemplary embodiment of the present invention.

FIG. 5 is a block diagram illustrating a PLC QoS processing unit modified for providing the QoS by monitoring the link state on the PLC network in a bridge system according to another exemplary embodiment of the present invention.

Referring to FIG. 5, the PLC QoS processing unit 150' further includes a PLC flow predictor 154 in addition to the PLC QoS mapper 151, the PLC link monitor 152 and the PLC connection manager 153. The PLC flow predictor 154 calculates a future effect by the link state of the monitored PLC network.

The PLC QoS processing unit 150' periodically checks the traffic state of the link set up on the high-speed PLC network through the PLC link monitor 152 and provides the traffic state to the PLC connection manager 153 and the PLC flow predictor 154.

The PLC connection manager 153 determines whether the link state of the monitored PLC network satisfies the desired QoS and performs an operation required for providing the desire QoS. The PLC flow predictor 154 calculates a future effect by the transmitted current link state and requests resources change based on the calculated prediction information to the PLC connection manager 153.

For example, when the resources of the current link are larger than or smaller than a pre-determined threshold, the link setup can be changed. It is also possible to predict resources, which will be required in a future, and request required resources more according to a current traffic increase rate.

For example, a procedure for the changing the resources includes the step of changing a CSPEC parameter and requesting resources change to the HPAV network and the bridge QoS sub-system.

The bridge system of the present embodiment can be set up by collecting the flow and corresponding QoS information based on a Universal Plug and Play (UPnP) Audio/Video (AV) structure.

Figure 6:
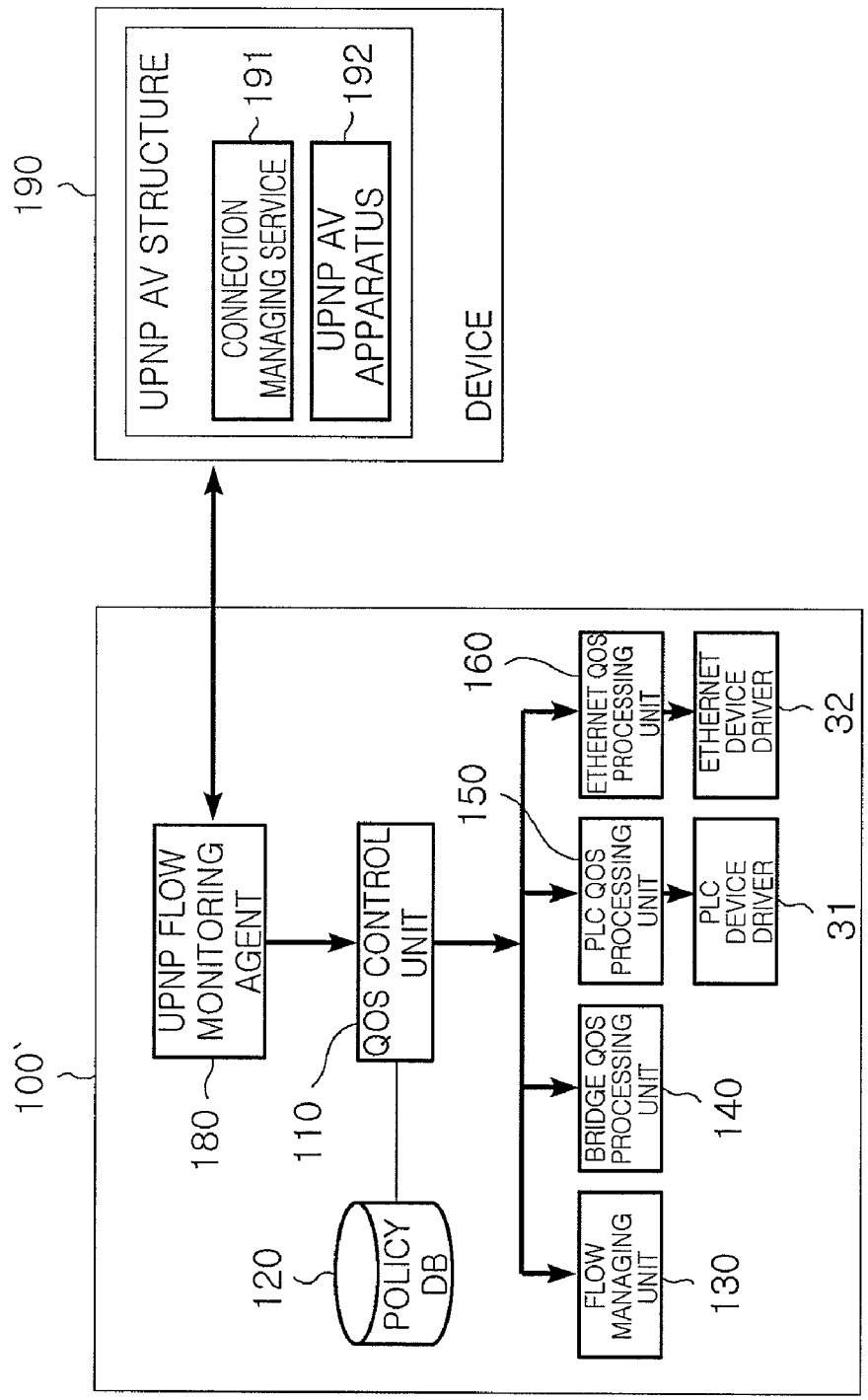
FIG. 6 is a block diagram illustrating a bridge system according to a fifth exemplary embodiment of the present invention.

FIG. 6 is a block diagram illustrating a bridge system using an UPnP AV structure according to another exemplary embodiment of the present invention.

Referring to FIG. 6, the bridge system of the present embodiment further includes an UPnP flow monitoring agent 180 in addition to the constitutional elements as shown in FIG. 2.

The UPnP flow monitoring agent 180 inquires and collects connection information and information on a data format transmitted through the corresponding connection from all devices 190 that can receive a connection managing service 191 from the UPnP AV structure connected to the Ethernet using the UPnP AV structure.

The collected connection information and data format information are transmitted to the QoS control unit 110. The QoS control unit 110 registers the collected connection information to the flow managing unit 130. Also, the QoS control unit 110 uses the data format used in each collected connection according to a pre-defined method in case of QoS and PLC connection setup in the bridge system.

As set forth above, according to preferred certain embodiments of the invention, a bridge system for connecting the Ethernet not providing QoS and the high speed PLC network providing QoS can adaptively provide QoS according to the characteristics of application service and traffic by solving a heterogeneity QoS problem between two networks.

While the present invention has been shown and described in connection with the preferred embodiments, it will be apparent to those skilled in the art that modifications and variations can be made without departing from the spirit and scope of the invention as defined by the appended claims.

What is claimed is:

1. A bridge system for connecting a high-speed Power Line Communication (PLC) network providing Quality of Service (QoS) and an Ethernet providing no QoS, the bridge system comprising:
    a Quality of Service (QoS) control unit for controlling a QoS process of the entire bridge system;
    a flow managing unit for storing and managing connection information of a flow, QoS information required by each flow, and information required for executing a bridge function;
    a bridge QoS processing unit for allocating and managing internal resources of the bridge system and providing the QoS by controlling the QoS control unit and making reference to information stored in the flow managing, wherein allocating and managing internal resources and providing the QoS Includes transforming QoS information provided from the QoS control unit into locally required QoS information in the inside of the bridge system, determining whether the local QoS can be satisfied by the bridge QoS processing unit, and allocating and managing internal resources of the bridge system according to the local QoS;
    a PLC QoS processing unit for managing the QoS of the PLC network by control of the QoS control unit, wherein managing the QoS of the PLC network includes transforming QoS information provided from the QoS control unit into QoS information proper to the PLC network; and
    an Ethernet QoS processing unit for managing a link state of the Ethernet and providing the link state to the QoS control unit.

2. The bridge system according to claim 1 further comprising:
    a policy database (DB) for storing a flow identifying policy and a managing policy for processing the QoS.

3. The bridge system according to claim 2, wherein the flow identifying policy information comprises at least one of a Media Access Control (MAC) address, Internet Protocol (IP) address, a port number, a protocol number and priority information.

4. The bridge system according to claim 2, wherein the flow managing unit comprises:
    a flow manager for managing flow information to provide the QoS and QoS information;
    a flow register table for storing information on a flow to provide the QoS by control of the flow manager; and
    a connection table for managing connection information and QoS information set up on the PLC network to provide the QoS.

5. The bridge system according to claim 2, wherein the bridge QoS processing unit comprises:
    a local resources manager for transforming the QoS information transmitted from the QoS control unit into locally required QoS information, checking whether the transformed QoS can be provided, and requesting resources allocation and a QoS process;

a local QoS mapper for transforming the QoS information into locally proper QoS information;

an admission controller for checking whether the QoS can be provided;

a local QoS monitor for monitoring a local QoS state;

an identifier for extracting connection information from a reception frame and selecting a corresponding QoS process policy in the flow managing unit based on the connection information;

a scheduler for controlling queuing of the reception frame according to the QoS process policy selected in the identifier; and a buffer manager for transmitting each frame, on which queuing is performed by control of the scheduler, to a destination according to the QoS process policy.

6. The bridge system according to claim 2, wherein the PLC QoS processing unit comprises:

a PLC QoS mapper for transforming QoS information provided from the QoS control unit into QoS information, which is proper to the PLC network;

a PLC link monitor for monitoring a link state and a QoS state set up on the PLC network; and a PLC connection manager for receiving service connection information and QoS information from the QoS control unit, transforming the QoS information into QoS information of the PLC network through the PLC QoS mapper, requesting connection setup and release to a PLC device driver based on the transformed QoS and service connection information, and transmitting a result value to the QoS control unit.

7. The bridge system according to claim 2, wherein the Ethernet QoS processing unit comprises:

an Ethernet link monitor for monitoring a link state of the connection by an Ethernet device driver; and an Ethernet connection manager for controlling connection setup and release on Ethernet.

8. The bridge system according to claim 2, further comprising:

an external input unit for receiving the policy information and the flow information from the outside of the bridge system and transmitting the policy information and the flow information to the QoS control unit.

9. The bridge system according to claim 8, wherein the QoS control unit reads a policy formation file from the outside of the bridge system through the external input unit or acquires flow register information or a policy, which are related to providing of the QoS by user input, and provides the information to the policy DB and the flow managing unit.

10. The bridge system according to claim 7, wherein the Ethernet QoS processing unit further comprises an Ethernet flow predictor for analyzing all traffic received through the Ethernet, calculating traffic characteristics and quantity of all flows, predicting the traffic characteristics for a pre-determined time hereinafter, and transmitting the traffic characteristics to the QoS control unit.

11. The bridge system according to claim 10, wherein the QoS control unit changes bridge resources allocation and connection setup, which can satisfy the characteristics of the traffic required by the PLC network, based on the Ethernet prediction information, and stores the set-up connection information in the flow managing unit.

12. The bridge system according to claim 6, wherein the PLC QoS processing unit further comprises a PLC flow predictor for calculating a future effect by the link state of the PLC network that the PLC link monitor monitors and requesting resources change to the PLC connection manager based on the calculated prediction information.

13. The bridge system according to claim 2, further comprising:

a Universal Plug and Play (UPnP) flow monitoring agent for inquiring and collecting connection information and information on a data format, which is transmitted through the corresponding connection, to all apparatuses capable of providing a connection management service, which is provided from a UPnP AV structure connected to its own Ethernet, based on the UPnP AV structure, and transmitting the collected connection information and data format information to the QoS control unit.

14. The bridge system according to claim 13, wherein the QoS control unit registers the connection information collected through the UPnP flow monitoring agent in the flow managing unit and uses the data format used in each connection to QoS and PLC connection setup in the bridge system by a pre-defined method.

* * * * *